(12) United States Patent
Tigges et al.

(10) Patent No.: US 12,319,368 B2
(45) Date of Patent: *Jun. 3, 2025

(54) UNDERCARRIAGE ASSEMBLY FOR A WORK MACHINE AND METHOD OF USE

(71) Applicant: DEERE & COMPANY, Moline, IL (US)

(72) Inventors: Michael R. Tigges, Dubuque, IA (US); Todd R. Simms, Peosta, IA (US); Russell R. Reeg, Bettendorf, IA (US)

(73) Assignee: Deere & Company, Moline, IL (US)

( * ) Notice: Subject to any disclaimer, the term of this patent is extended or adjusted under 35 U.S.C. 154(b) by 471 days.

This patent is subject to a terminal disclaimer.

(21) Appl. No.: 17/702,851

(22) Filed: Mar. 24, 2022

(65) Prior Publication Data

US 2022/0212734 A1 Jul. 7, 2022

Related U.S. Application Data

(63) Continuation of application No. 16/532,902, filed on Aug. 6, 2019, now Pat. No. 11,345,420.

(51) Int. Cl.
| | |
|---|---|
| *B62D 55/084* | (2006.01) |
| *B62D 21/02* | (2006.01) |
| *B62D 55/104* | (2006.01) |
| *B62D 55/20* | (2006.01) |
| *B62D 55/205* | (2006.01) |

(52) U.S. Cl.
CPC ......... *B62D 55/084* (2013.01); *B62D 21/02* (2013.01); *B62D 55/104* (2013.01); *B62D 55/202* (2013.01); *B62D 55/205* (2013.01)

(58) Field of Classification Search
CPC .. B62D 55/084; B62D 55/104; B62D 55/202; B62D 55/205; B62D 55/30; B62D 55/14
See application file for complete search history.

(56) References Cited

U.S. PATENT DOCUMENTS

| | | |
|---|---|---|
| 1,588,159 A | 6/1926 | Bolgiano |
| 2,125,531 A | 8/1938 | Weeks |
| 3,323,841 A | 6/1967 | Mason |
| 4,101,177 A | 7/1978 | Bianchi |
| 4,413,862 A | 11/1983 | Ragon |
| 2003/0168262 A1 | 9/2003 | Hibbert |

FOREIGN PATENT DOCUMENTS

| | | |
|---|---|---|
| AT | 511415 A2 | 11/2012 |
| GB | 2522474 A | 7/2015 |
| JP | 2005255043 A | 9/2005 |

*Primary Examiner* — Valentin Neacsu
*Assistant Examiner* — Abigail R Hymel
(74) *Attorney, Agent, or Firm* — Taft Stettinius & Hollister LLP; Stephen F. Rost

(57) ABSTRACT

A work machine includes an undercarriage assembly. The undercarriage assembly includes a chassis and a ground-engaging mechanism for rotating around the chassis to move the work machine. A pair of rails is coupled to the chassis. A pair of sliders is coupled to a front-assembly. The sliders are aligned with the rails and movable relative to the rails to facilitate movement of the front-end assembly relative to the chassis.

20 Claims, 6 Drawing Sheets

UNDERCARRIAGE ASSEMBLY FOR A WORK MACHINE AND METHOD OF USE

RELATED DISCLOSURES

This application is a continuation of U.S. patent application Ser. No. 16/532,902, filed Aug. 6, 2019, the disclosure of which is hereby incorporated by reference in its entirety.

FIELD OF THE DISCLOSURE

The present disclosure relates to a work machine and in particular to an undercarriage assembly for a work machine.

BACKGROUND OF THE DISCLOSURE

Work machines such as crawlers may include one or more ground-engaging mechanisms for propelling the machine along the ground or an underlying surface. In some cases, these ground-engaging mechanisms may include one or more crawler tracks configured support, and in some cases, rotate around a chassis. Challenges may arise supporting vertical and lateral loads applied to different components of the machine. The machines may be operated in environments commonly containing dirt and debris, which may present additional challenges.

SUMMARY

In one embodiment of the present disclosure, an undercarriage assembly for a work machine includes chassis, a ground-engaging mechanism, a front-end assembly, a wedge-shaped slider, and a rail. The chassis extends from a forward end to an aft end. The ground-engaging mechanism surrounds the chassis and is configured to rotate around the chassis during operation of the work machine. The front-end assembly is movable axially relative to the chassis. The front-end assembly includes a lower frame and an upper frame. The lower frame is coupled to (i) a pair of rollers that are movable relative to one another in the vertical and axial directions and (ii) an idler that is movable relative to the pair of rollers in the vertical and axial directions and configured to rotate about an axis transverse to the lower frame. The upper frame is movable in the vertical direction relative to the lower frame. The wedge-shaped slider coupled to the upper frame. The rail includes a first side coupled to the chassis and a second side defining a v-shaped groove configured to receive the wedge-shaped slider and guide axial movement of the front-end assembly relative to the chassis.

In the illustrative embodiment, the rail is positioned between the forward end and the aft end of the chassis. The wedge-shaped slider is removably coupled to the upper frame. The rail is removably coupled to the chassis. The wedge-shaped slider includes a first end that is removably coupled to the upper frame, a second end spaced apart from the first end, and a pair of sloped sides that converge as the sides extend from the first end to the second end.

In the illustrative embodiment, the second side of the rail includes an inner surface defining a deepest portion of the v-shaped groove, and the second end of the wedge-shaped slider is spaced apart from the inner surface when the wedge-shaped slider is positioned in the v-shaped groove. The second side of the rail includes a pair of sloped surfaces that diverge as the sloped surfaces extend toward an opening of the v-shaped groove. The sloped surfaces of the v-shaped groove cooperate with the sloped sides of the wedge-shaped slider to define a passageway having an inlet and an outlet each defined at the opening of the v-shaped groove, and each portion of the passageway has a vertical component of extension.

In another embodiment, an undercarriage assembly for a work machine includes chassis, a rail, a ground-engaging mechanism, a front-end assembly, an idler, and a slider. The chassis extends from a forward end to an aft end. The ground-engaging mechanism is configured to support the chassis. The front-end assembly is movable axially relative to the chassis. The idler is coupled to the front-end assembly at a rotational axis of the idler. The rail is coupled to one of the chassis and the front-end assembly. The slider has a first end coupled to the other of the chassis and the front-end assembly, and a second end opposite the first end. The rail includes a v-shaped groove defined by a pair of surfaces that diverge as the surfaces extend laterally toward an opening of the v-shaped groove. The slider includes pair of sides that converge as the sides extend from the first end to the second end of the slider.

In the illustrative embodiment, when the slider is positioned in the v-shaped groove of the rail, the rail and the slider are positioned between the forward end and the aft end of the chassis. The slider is removably coupled to one of the chassis and the front-end assembly. The rail is removably coupled to one of the chassis and the front-end assembly. The v-shaped groove is further defined by an inner surface positioned between the pair of surfaces, and the second end of the slider is spaced apart from the inner surface when the slider is positioned in the v-shaped groove of the rail. When the slider is positioned in the v-shaped groove of the rail, the slider is movable relative to the rail in the axial, lateral, and vertical directions. The slider is movable in the vertical direction relative to the rail to open and close portions of continuously downwardly-advancing passageway defined between the pair of sides of the slider and the pair of surfaces the rail.

In the illustrative embodiment, the rail includes an abutment surface positioned above the v-shaped groove when the rail is coupled to the chassis. The chassis includes a strut positioned above the abutment surface of the rail to prevent upward movement of the rail beyond the strut.

In another embodiment, the method of operating an undercarriage assembly for a work machine includes fastening a pair of wedge-shaped sliders to a front-end assembly of the undercarriage, fastening a pair of rails, each having a v-shaped groove, to a chassis of the undercarriage; positioning a slider of the pair of wedge-shaped sliders in a v-shaped groove of a rail of the pair of rails; and sliding the slider axial relative to the rail to move the front-end assembly axially relative to the chassis.

In the illustrative embodiment, fastening a pair of wedge-shaped sliders to a front-end assembly of the undercarriage includes: fastening a slider of the pair of wedge-shaped sliders in a first position in which a first sloped side of the slider is positioned above a second sloped side of the slider. The method further includes: removing the slider from the front-end assembly; and fastening the slider in a second position in which the second sloped side is positioned above the first sloped side. Fastening a pair of wedge-shaped sliders to a front-end assembly of the undercarriage includes: fastening a first slider of the pair of wedge-shaped sliders to a first side of the front-end assembly and fastening a second slider of the pair of wedge-shaped sliders to a second side of the front-end assembly. The method further includes removing the first slider from the front-end assembly; removing the second slider from the front-end assembly; and fastening the first slider to the second side of the front-end assembly.

In the illustrative embodiment, the method further includes positioning, in response to gravity, an idler at the midpoint between the pair of rails, wherein the idler is coupled to the front-end assembly laterally between the pair of wedge-shaped sliders.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
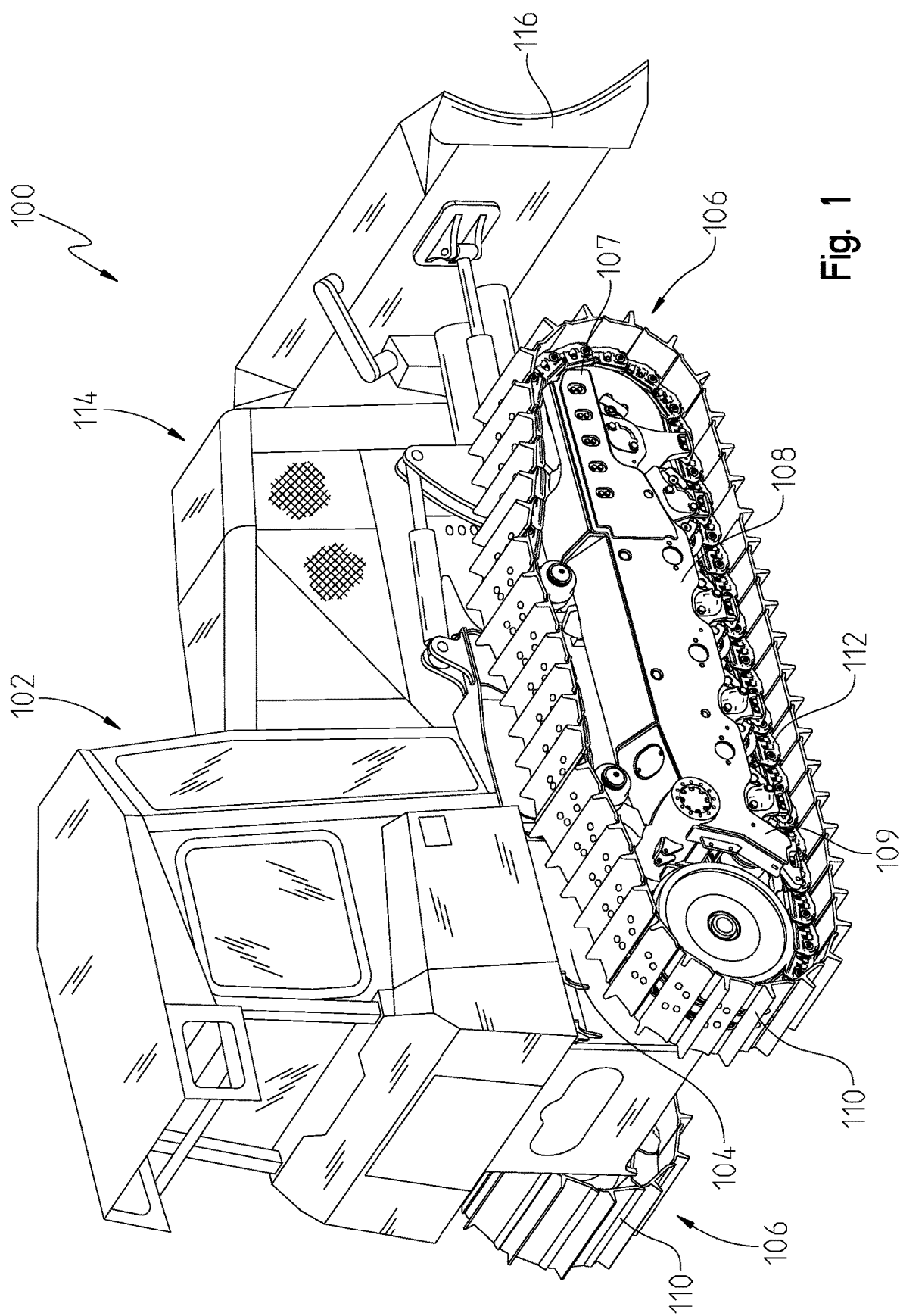
FIG. 1 is a perspective view of a work machine showing that the work machine includes an undercarriage having a chassis surrounded by a ground-engaging mechanism.

An exemplary embodiment of a work machine is shown in FIG. 1. The machine is embodied as a crawler 100. The present disclosure is not limited, however, to a crawler and may extend to other work machines that perform desired operations. As such, while the figures and forthcoming description may relate to a crawler, it is to be understood that the scope of the present disclosure extends beyond a crawler and, where applicable, the term "machine" or "work machine" may be used instead. The term "machine" or "work machine" is intended to be broader and encompass other vehicles besides a crawler for purposes of this disclosure.

Referring to FIG. 1, the crawler 100 includes a cab 102 that is coupled to a base frame 104 of the machine. The cab 102 can include controls such as a steering wheel, buttons, levers, joysticks, foot pedals, and the like for controlling the crawler 100. Besides the base frame 104, the crawler 100 further includes a pair of undercarriage assemblies 106.

Each under carriage assembly 106 includes at least a chassis 108 and a ground-engaging mechanism 110 supported in part by the chassis 108.

The chassis 108 includes a forward end 107 and aft end 109. The ground-engaging mechanism 110 includes a chain 112 driven by a final drive assembly (not shown) to move the crawler 100. The final drive assembly can be driven by a motor or other power mechanism. An engine or other power device 114 can provide the overall power for the crawler 100. As also shown in FIG. 1, the crawler 100 can include a tool implement 116 such as a blade for performing a desired task. The tool implement 116 can be controlled by an operator via one of a plurality of controls disposed in the cab 102.

Figure 2:
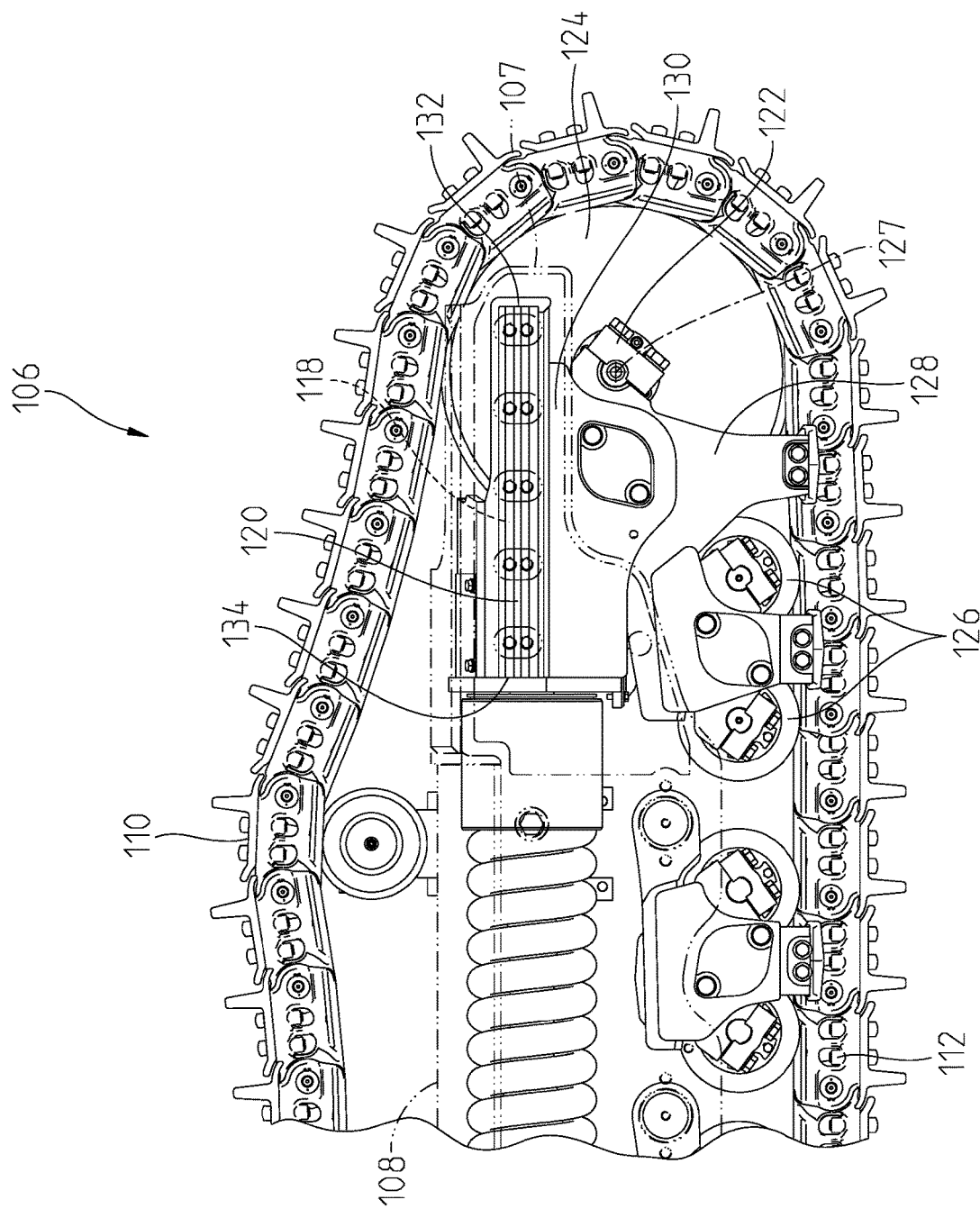
FIG. 2 is a side view of the undercarriage of FIG. 1 showing the chassis in phantom.

As shown in FIG. 2, in addition to the chassis 108 and the ground-engaging mechanism 110, the undercarriage assembly 106 further includes a pair of sliders 118, a pair of rails 120, and a front end assembly 122. It should be appreciated that the pair of sliders 118 are configured to slide along the pair of rails 120 to facilitate axial movement of the front-end assembly 122 relative to the chassis 108; however, the sliders and rails will be described in greater detail below with reference to FIG. 3-7.

Referring still to FIG. 2, the front-end assembly 122 is illustratively shown as an idler-double-roller-type front-end assembly. As such, the front-end assembly 122 is coupled to an idler 124 and a pair of bogey-mounted rollers 126. The idler 124 is coupled to the front-end assembly 122 at a rotational axis 127 of the idler 124 that extends transverse to the front-end assembly 122. The pair of bogey-mounted rollers 126 are moveable relative to each other in the axial and vertical directions, and the idler 124 is moveable relative to the pair of bogey-mounted rollers 126 in the axial and vertical directions. In some embodiments, the front-end assembly 122 includes a lower frame 128 and an upper frame 130. The lower frame 128 is coupled to the idler 124 and the pair of bogey-mounted rollers 126 as described above. The lower frame 128 is configured to pivot relative to the upper frame 130 as the crawler 100 moves over uneven surfaces.

As described above, the undercarriage assembly 106 includes a pair of sliders 118 and a pair of rails 120. It should be appreciated that the sliders 118 of the pair of sliders 118 are identical to one another, with the exception of manufacturing variances and wear and tear introduced during operation of the crawler 100, and as such, any description of a slider 118 applies with equal force to the both sliders of the pair of sliders 118. Similarly, it should be appreciated that the rails 120 of the pair of rails 120 are identical to one another, with the exception of manufacturing variances and wear and tear introduced during operation of the crawler 100, and as such, any description of a rail applies with equal force to the both rails 120 of the pair of rails 120.

Figure 3:
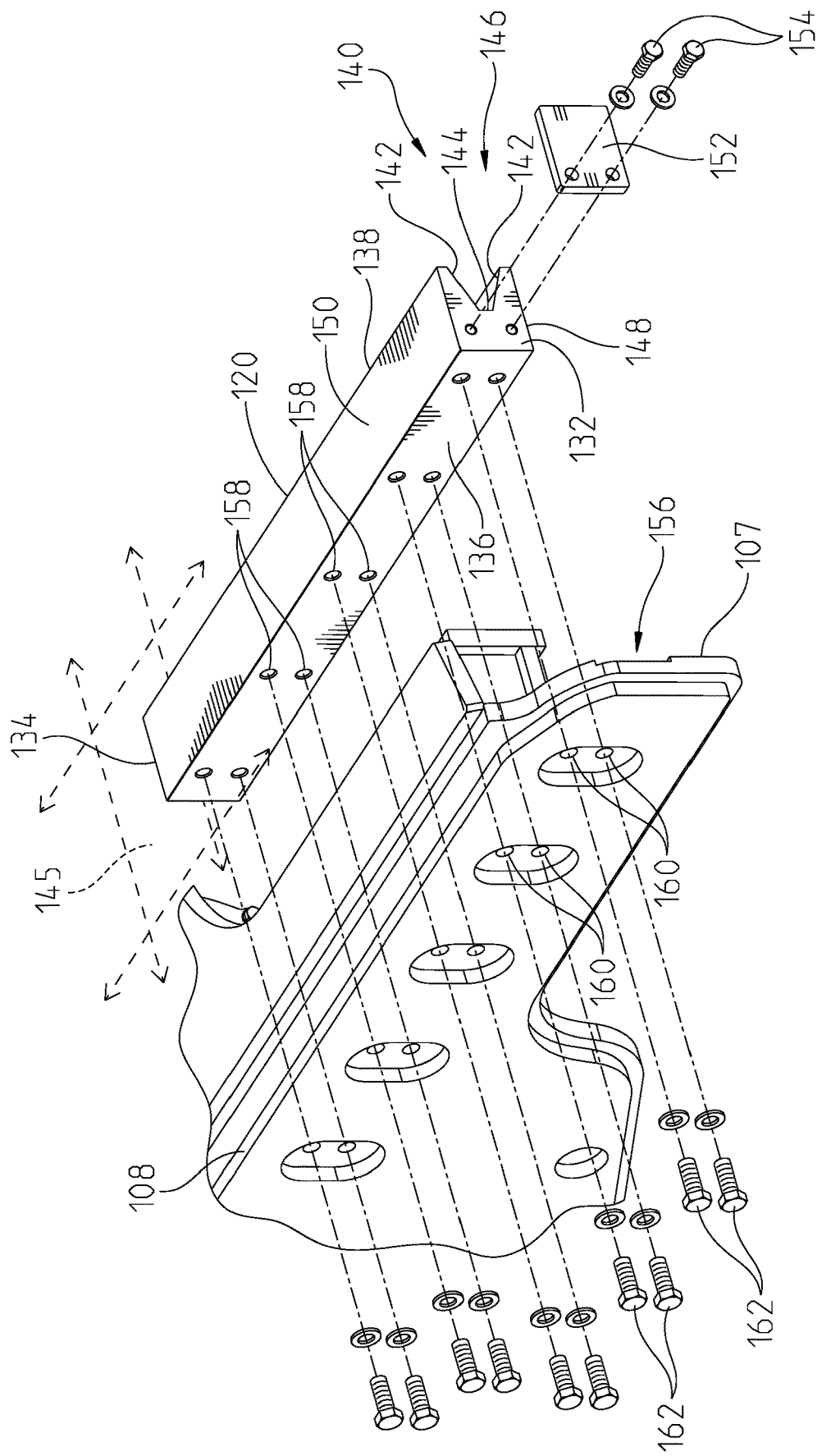
FIG. 3 is a front view of the undercarriage assembly of FIG. 2 showing a front end assembly including an idler coupled to a pair of sliders that are supported by and configured to slide along a pair of rails.

As shown in FIG. 3, each rail 120 of the undercarriage 106 includes a forward end 132 and an aft end 134. The rail 120 is configured to be coupled to the chassis 108. In the illustrative embodiment, the rail 120 is coupled to the chassis 108 such that the forward end 132 of the rail 120 is positioned rearwardly of the forward end 107 of the chassis 108. Likewise, the aft end 134 of the rail 120 is positioned forwardly of the aft end 109 (not shown) of the chassis 108. As such, in the illustrative embodiment, the rail 120 is not a cantilevered component fixed only at one end to the chassis 108. In other words, the forward end 132 of the rail 120 does not extend beyond the chassis 108. The arrangement described in the illustrative embodiment provides additional structural integrity beyond a design in which a rail (or a similar component coupled to a chassis to facilitate axial movement of an idler) is a cantilevered component.

The rail 120 includes a first side 136 coupled to the chassis 108 and a second side 138 positioned opposite the first side 136. The second side 138 includes a plurality of surfaces that cooperate to define a v-shaped groove 140. In the illustrative embodiment, the second side 138 of the rail 120 includes a pair of sloped surfaces 142 and an inner surface 144 positioned between the pair of sloped surfaces 142. The inner surface 144 is spaced apart from an opening 146 of the v-shaped groove 140 and defines a deepest portion of the v-shaped groove 140. The pair of sloped surfaces 142 diverge from one another as the sloped surfaces 142 extend from the inner surface 144 to the opening 146 of the v-shaped groove 140.

In the illustrative embodiment, with the exception of slight manufacturing variances and wear and tear, the sloped surfaces 142 are symmetrical with each other across an imaginary plane 145 that extends laterally and axially through a vertical midpoint of the rail 120. It should be appreciated that in other embodiments, the sloped surfaces 142 may not be symmetrical with each other, especially if the sloped surfaces 142 are manufactured to lack symmetry based on known wear patterns associated with individual surfaces 142 of the pair of sloped surfaces 142. In some embodiments, the sloped surfaces 142 may extend from the opening 146 to a physical point of convergence, in which case the point of converge is synonymous with the inner surface 144. A relationship between the inner surface 144 of the v-shaped groove 140 and the slider 118 will be described in greater detail below.

The rail 120 further includes a bottom side 148 and a top side 150 each extending between the first side 136 and the second side 138 of the rail 120. The rail 120 further includes an end cap 152 coupled to the forward end 132 of the rail 120 with at least one fastener 154, as shown for example in FIG. 3. The top side 150 or bottom side 148 and the end cap 152 abut other components of the undercarriage assembly 106 to limit relative movement of components. The top side 150, bottom side 148, and the end cap 152 will be described in relation to the other components in greater detail below.

Referring still to FIG. 3, the chassis 108 includes a slot 156 sized and shaped to receive the first side 136 of the rail 120. The slot 156 orients the rail 120 on the chassis 108 so that a user may easily recouple the rail 120 to the chassis 108 after the rail 120 has been removed for maintenance or any other reason. The rail 120 includes a plurality of apertures 158, and the chassis 108 includes a corresponding plurality of apertures 160. A corresponding plurality of fasteners 162 may be inserted in the pluralities of apertures 158, 160 to couple the rail 120 to the chassis 108. Conversely, the plurality of fasteners 162 may be removed from the pluralities of apertures 158, 160 to remove the rail 120 from the chassis 108. While a number of apertures 158, 160 and fasteners 162 are shown in FIG. 3, it should be appreciated that other numbers of apertures 158, 160 and fasteners 162 may be included so long as the rail 120 is sufficiently coupled to and removable from the chassis 108.

Figure 4:
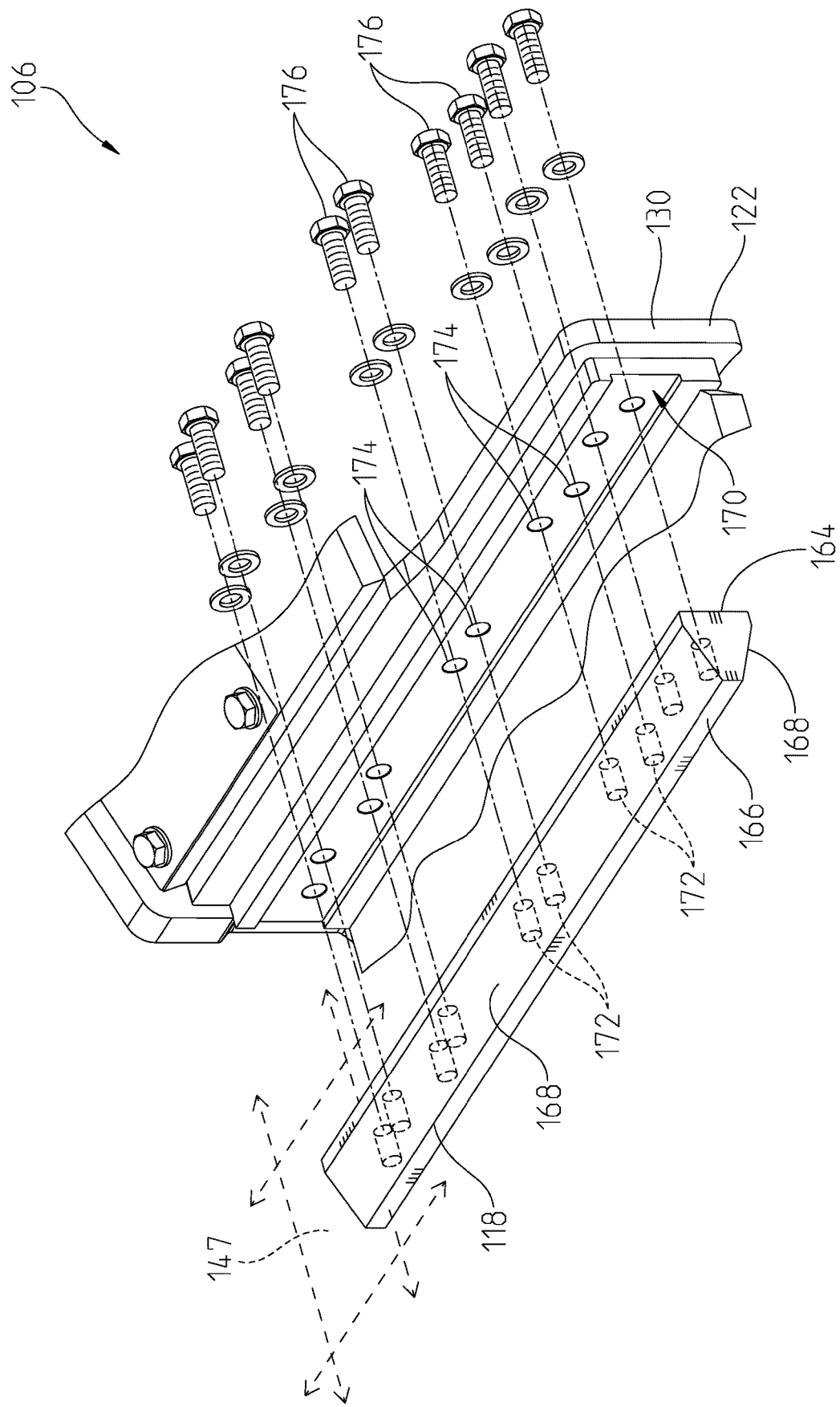
FIG. 4 is an exploded perspective view of a rail of FIG. 3 showing that fasteners couple the rail to the chassis.

As shown in FIG. 4, each slider 118 of the undercarriage 106 is a wedge-shaped slider. As defined herein, what is meant by wedge-shaped is shaped as so to taper from a first end to a thinner second end. In the illustrative embodiment, the slider 118 includes a first end 164 having first width and a second end 166 having a second width that is less than the first width. The slider 118 further includes a pair of sloped sides 168 that converge (or taper) as the sides 168 extend from the first end 164 to the second end 166. In the illustrative embodiment, with the exception of slight manufacturing variances and wear and tear, the sloped side 168 are symmetrical with each other across an imaginary plane 147 that extends laterally through a vertical midpoint of the slider 118. It should be appreciated that in other embodiments, the sloped sides 168 may not be symmetrical with each other, especially if the sloped slides 168 are manufactured to lack symmetry based on known wear patterns associated with individual sides 168 of the pair of sloped sides 168.

Referring still to FIG. 4, the slider 118 is configured to be coupled to the upper frame 130 of the front-end assembly 122. In the illustrative embodiment, the upper frame 130 includes a slot 170 sized and shaped to receive the first end 164 of the slider 118. The slot 170 orients the slider 118 on the upper frame 130 so that a user may easily recouple the slider 118 to the upper frame 130 after the slider 118 has been removed for maintenance or any other reason. The slider 118 includes a plurality of apertures 172, and the upper frame 130 includes a corresponding plurality of apertures 174. A corresponding plurality of fasteners 176 may be inserted in the pluralities of apertures 172, 174 to couple the slider 118 to the upper frame 130. Conversely, the plurality of fasteners 176 may be removed from the pluralities of apertures 172, 174 to remove slider 118 from the upper frame 130. While a number of apertures 172, 174 and fasteners 176 are shown in FIG. 4, it should be appreciated that other numbers of apertures 172, 174 and fasteners 176 may be included so long as the slider 118 is sufficiently coupled to and removable from the upper frame 130. It should be appreciated that while the front-end assembly 122 has been described as having an upper frame 130 and a lower frame 128, in some embodiments, the front-end assembly 122 may be a one-piece component, in which case the upper frame 130 and the lower frame 128 are defined as a single, monolithic component.

Figure 5:
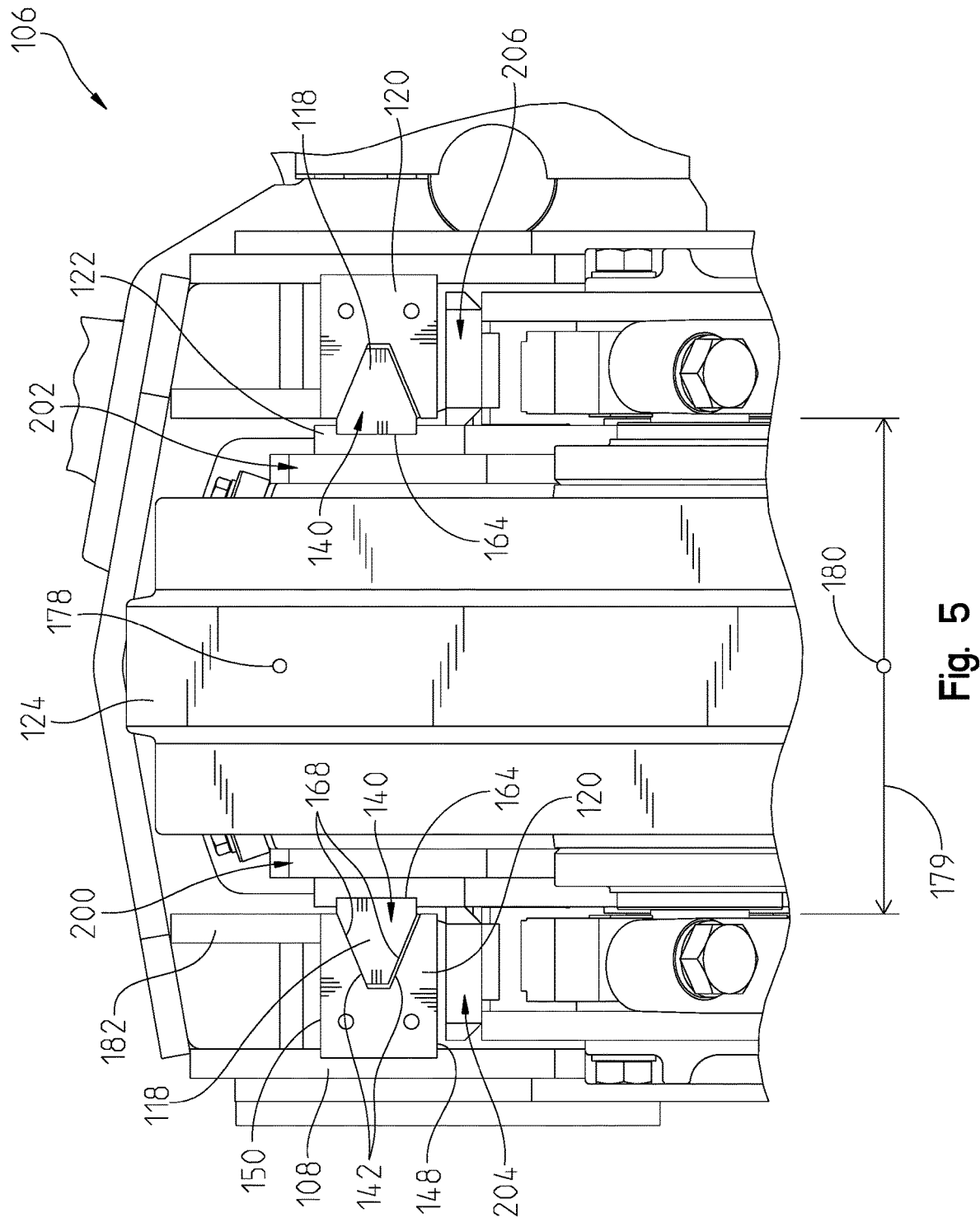
FIG. 5 is an exploded perspective view of a slider of FIG. 3 showing that fasteners couple the slider to the front-end assembly.

As shown in FIG. 5, the first end 164 of each slider 118 is coupled to the front-end assembly 122, and the idler 124 is coupled laterally between the pair of sliders 118. Additionally, each rail 120 is coupled to the chassis 108, and the rails 120 are spaced apart from one another a distance 179. In the illustrative embodiment, the rails 120 are aligned vertically and laterally with the sliders 118, such that the sliders 118 are positioned in the v-shaped groove 140 of the rails 120. In such an arrangement, the sliders 118 are configured to translate axially in the v-shaped groove 140 to facilitate axial movement of the front-end assembly 122 relative to the chassis 108. As suggested by FIGS. 3 and 5, the end cap 152 coupled to the forward end 148 of the rail 120 is configured to abut the slider 118 to prevent axial movement of the slider 118 beyond the end cap 152.

During operation of the crawler 100, the front-end assembly 122 may experience slight lateral and vertical movements relative to the chassis 108, which applies lateral and vertical loads to the chassis 108. Because the surfaces 142 of the rails 120 are sloped, the surfaces 142 are configured to abut the sloped sides 168 of the sliders 118 to support downward and upward vertical loads as well as inward and outward lateral loads. As used herein, inward and outward are referenced relative to the base frame 104 (see FIG. 1). Additionally, because the surfaces 142 of the rails 120 and the sides 168 of the sliders 118 are each sloped, the sliders 118 are configured to slide downwardly (and therefore laterally) to align laterally a center point 178 of the idler 124 with a midpoint 180 of the distance 179 between the rails 120. This alignment occurs in response to the downward force of gravity acting on at least the front-end assembly 122, the idler 124, and the rails 118.

As the ground-engaging mechanism 110 (see FIGS. 1 and 2) passes over foreign objects or uneven surfaces, the idler 124 (or more specifically, the sliders 118 coupled thereto via the front-end assembly 122) may exert and an upward force (i.e.: an upward vertical load) on the rails 120. As such, the top surface 150 or the bottom surface 148 of each rail 120 may define an abutment surface 149. The abutment surface is determined based on which surface 148, 150 is positioned vertically above the other surface 148, 150 when the rail 120 is coupled to the chassis. The abutment surface 149 of each rail 120 may abut a strut 182 of the chassis 108 positioned above the abutment surface 149 to prevent the rail 120 from moving upward beyond strut 182.

Figure 6:
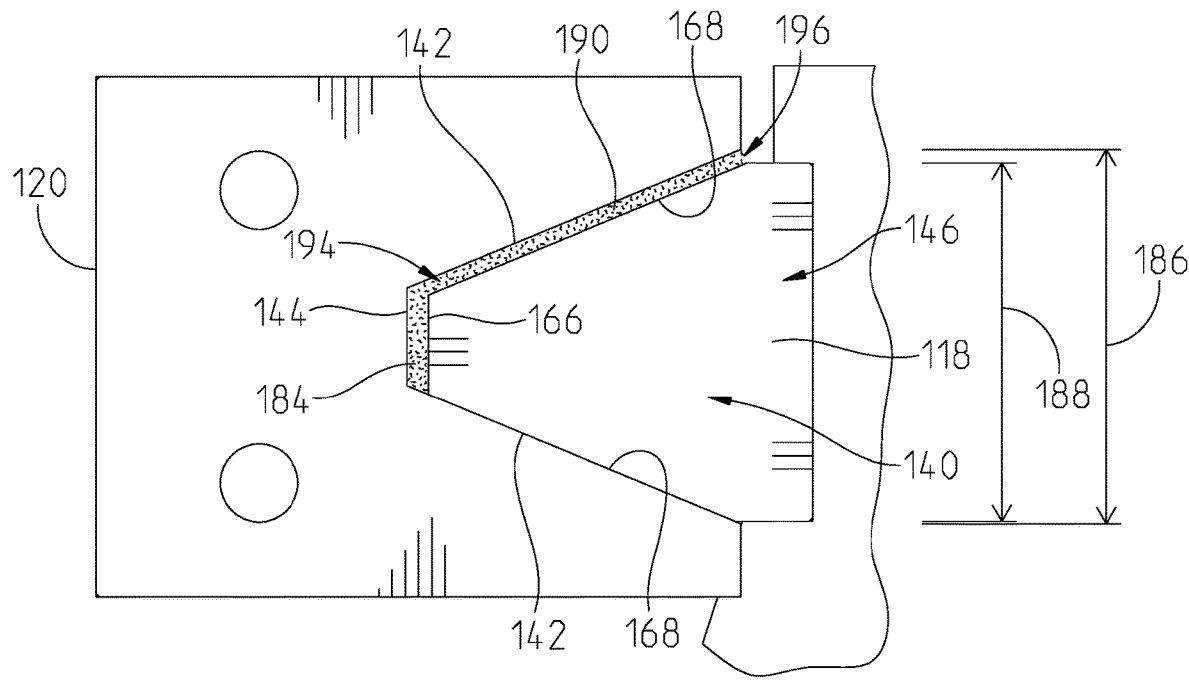
FIG. 6 is a front view of a slider and a rail of FIG. 3 showing dirt in a first portion of a passageway formed between the slider and the rail.
Figure 7:
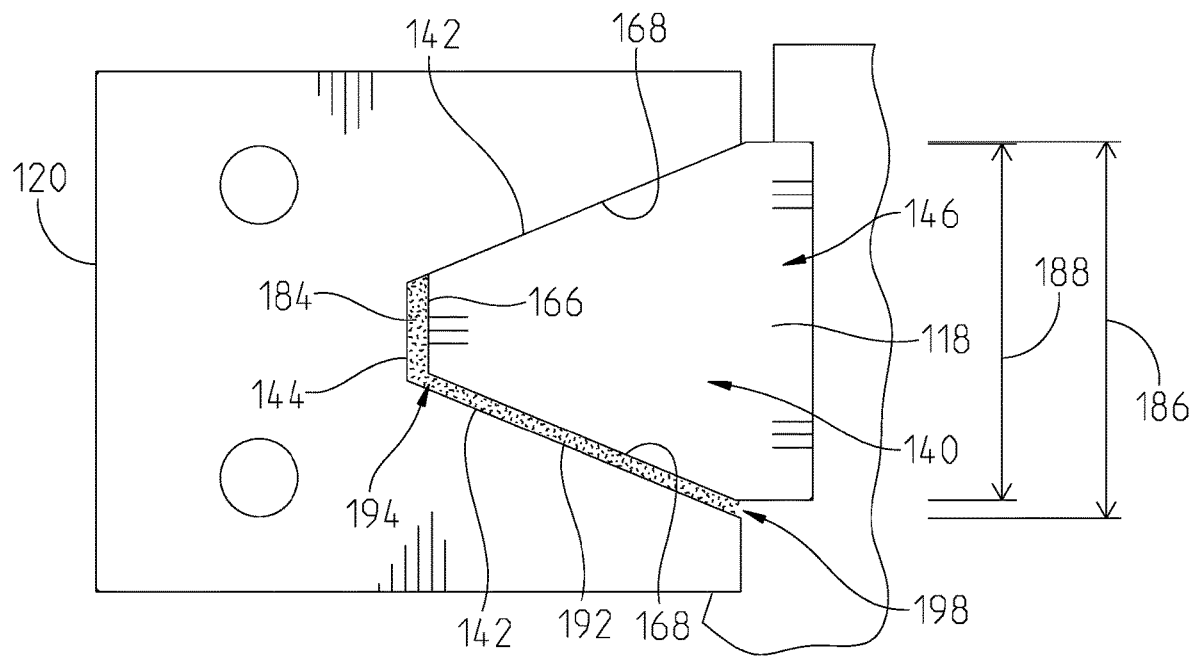
FIG. 7 is a front view of a slider and a rail similar to FIG. 6 showing dirt and debris in a second portion of the passageway formed between the slider and the rail.

Referring now to FIGS. 6 and 7, when each slider 118 is positioned in a v-shaped groove 140 of a corresponding rail 120, the second end 166 of the slider 118 is spaced apart from the inner surface 144 of the rail 120. As such, a first gap 184 is defined between the inner surface 144 of the rail 120 and the second end 166 of the slider 118.

As shown in FIGS. 6 and 7, a maximum distance 186 is defined between the pair of sloped surfaces 142; a maximum distance 188 is defined between the pair of sloped sides 168; and the maximum distance 186 between the surfaces 142 is greater than the maximum distance 188 between the sides 168. During operating of the crawler 100, the sliders 118 oscillate vertically in the v-shaped grooves 140 of the rails 120. As such, a second gap 190 (see FIG. 6) and a third gap 192 (see FIG. 7) each open and close during operation of the crawler 100. The second and third gaps 190, 192 are formed between the sloped surfaces 142 of the rails 120 and the sloped sides 168 of the sliders 118. The second gap 190 extends downwardly from the opening 146 of the v-shaped groove 140 to the first gap 184. The first gap 184 extends downwardly from a lower end of the second gap 190 to an upper end of the third gap 194. The third gap 194 extends downwardly from the first gap 184 to the opening 146 of the v-shaped groove 140. As such, each gap 184, 190, 192 has a vertical component of extension.

In the illustrative embodiment, the gaps 184, 190, 192 may also be referred to as portions 184, 190, 192 of a passageway 194. The passageway 194 includes an inlet 196 and an outlet 198 that are each defined at the opening 146 of the v-shaped groove 140. The inlet 196 is defined above the slider 118, and the outlet 198 is defined below the slider 118. As such, the outlet 198 is below the inlet 196. The passageway 194 extends from the inlet 196 to the outlet 198, and each portion 184, 190, 192 of the passageway 194 has a vertical component of extension. As such, the passageway 194 is a continuously downwardly-advancing passageway 194, advancing continuously downwardly from the inlet 196 to the outlet 198. In use, a user may operate the crawler 100 to move the pair of wedge-shaped sliders 118 vertically relative to the pair of rails 120 to open and close portions 190, 192 of the continuously downwardly-advancing passageway 194.

As shown in FIGS. 6 and 7, during operation of the crawler 100, dirt and debris may fall from the ground-engaging mechanism 110 and settle between (or by other means become positioned between) the slider 118 and the rail 120. Because the passageway 194 is a continuously downwardly-advancing passageway 194, the passageway 194 facilitates movement of dirt and debris out of the passageway 194 during operation of the crawler 100. In FIG. 6, dirt and debris are shown in the second and first portions 190, 184 of the passageway 194, and in FIG. 7 the same dirt and debris has advanced downward to the first and third portions 184, 192 of the passageway 194. The dirt and debris will continue to advance downward to exit the third portion 192 of the passageway 194.

It should be appreciated that, in the illustrative embodiment, the sliders 118 are removable from the front-assembly 122 (or the upper frame 130), and the rails 120 are removable from the chassis 108. During operation of the crawler 100, one side 168 of a slider 118 or one surface 142 of a rail 120 may become worn. It may be advantageous to remove a slider 118 or a rail 120 and recouple the slider 118 or the rail 120 in an upside-down orientation. In use, a user may fasten the slider 118 to the front-end assembly 122 in a first position, in which a first sloped side 168 is positioned above a second sloped side 168 of the slider 118. The user may remove the slider 118 from the front-end assembly 122. Subsequently, the user may fasten the slider 118 in a second position, in which the second sloped side 168 is positioned above the first sloped side 168. Similarly, a user may fasten the rail 120 to the chassis 108 in a first position, in which a first sloped surface 142 is positioned above a second sloped surface 142 of the rail 120. The user may remove the rail 120 from the chassis 108. Subsequently, the user may fasten the rail 120 in a second position, in which the second sloped surface 142 is positioned above the first sloped surface 142.

In some embodiments, prior to fastening the pair of rails 120 to the chassis 108 of the undercarriage assembly 106, a user may position the pair of rails 120 axially between a forward end 107 and an aft end 109 of the chassis 108. With the pair of rails 120 positioned axially between the forward end 107 and an aft end 109 of the chassis 108, the user may fasten the pair of rails 120 to the chassis 108 of the undercarriage assembly 106.

During operation of the crawler 100, one or more sides 168 of a slider 118 or one or more surfaces 142 of a rail 120 may experience a unique wear pattern. It may be advantageous to remove a slider 118 or a rail 120 and recouple the slider 118 or the rail 120 in place of a different slider 118 or a different rail 120 on the crawler 100. In use, a user may fasten a first slider 118 to a first side 200 (see FIG. 5) of the front-end assembly 122 and fasten a second slider 118 to a second side 202 (see FIG. 5) of the front-end assembly 122. The user may remove the first slider 118 from the front-end assembly 122 and remove the second slider 118 from the front-end assembly 122. Subsequently, the user may fasten the first slider 118 to the second side 202 of the front-end assembly 122. The user may fasten the second slider 118 to the first side 200 of the front-end assembly 122. It should be appreciated that in a work machine including more than two sliders 118, each slider 118 may replace any other slider 118 of the work machine.

In use, a user may fasten a first rail 120 to a first side 204 (see FIG. 5) of the chassis 108 and fasten a second rail 120 to a second side 206 (see FIG. 5) of the chassis 108. The user may remove the first rail 120 from the chassis 108 and remove the second rail 120 from the chassis 108. Subsequently, the user may fasten the first rail 120 to the second side 206 of the chassis 108. The user may fasten the second rail 120 to the first side 204 of the chassis 108. It should be appreciated that in a work machine including more than two rails 120, each rail 120 may replace any other rail 120 of the work machine.

While the illustrative embodiments herein generally describe that the rail 120 (including the v-shaped groove 140) is coupleable to the chassis 108 and the slider 118 is coupleable to the front-end assembly 122, it should be appreciated that in other illustrative embodiments the rail 120 (including the v-shaped groove 140) is coupleable to the front-end assembly 122, and the slider 122 is coupleable to the chassis 108. In this configuration, the arrangement of rails 120 relative to the sliders 118 is merely reversed. As such, in the illustrative embodiment, the rail 120 is coupled to one of the chassis 108 and the front-end assembly 122. The slider 118 includes a first end 164 and a second end 166. The first end 164 is coupled to the other of the chassis 108 and the front-end assembly 122, and the second end 166 is positioned opposite the first end 164. In other words, the slider 118 is coupled to the component 108 or 122 that is not coupled to the rail 120.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. An undercarriage assembly for a work machine, comprising:
   a chassis extending from a forward end to an aft end;
   a ground-engaging mechanism configured to support the chassis;
   a front-end assembly movable axially relative to the chassis;
   an idler coupled to the front-end assembly at a rotational axis of the idler;
   a rail coupled to one of the chassis and the front-end assembly; and
   a slider having:
      a first end coupled to the other of the chassis and the front-end assembly, and
      a second end opposite the first end;
   wherein the rail includes a v-shaped groove defined by a pair of surfaces that diverge as the surfaces extend laterally toward an opening of the v-shaped groove;
   wherein the slider includes a pair of sides that converge as the sides extend from the first end to the second end of the slider; and
   wherein when the slider is positioned in the v-shaped groove of the rail, the slider is movable relative to the rail in axial and lateral directions.

2. The undercarriage assembly of claim 1, where when the slider is positioned in the v-shaped groove of the rail, the rail and the slider are positioned between the forward end and the aft end of the chassis.

3. The undercarriage assembly of claim 2, wherein:
   the rail includes an abutment surface positioned above the v-shaped groove when the rail is coupled to the chassis; and
   the chassis includes a strut positioned above the abutment surface of the rail to prevent upward movement of the rail beyond the strut.

4. The undercarriage assembly of claim 1, wherein the slider is removably coupled to one of the chassis and the front-end assembly.

5. The undercarriage assembly of claim 1, wherein the rail is removably coupled to one of the chassis and the front-end assembly.

6. The undercarriage assembly of claim 1, wherein the v-shaped groove is further defined by an inner surface positioned between the pair of surfaces; and
   the second end of the slider is spaced apart from the inner surface when the slider is positioned in the v-shaped groove of the rail.

7. The undercarriage assembly of claim 1, wherein:
   when the slider is positioned in the v-shaped groove of the rail, the slider is movable relative to the rail in a vertical direction.

8. The undercarriage assembly of claim 7, wherein the slider is movable in the vertical direction relative to the rail to open and close portions of continuously downwardly-advancing passageway defined between the pair of sides of the slider and the pair of surfaces of the rail.

9. The undercarriage assembly of claim 1, wherein the sides of the slider are symmetrical.

10. An undercarriage assembly for a work machine, comprising:
    a chassis extending from a forward end to an aft end;
    a ground-engaging mechanism configured to support the chassis;
    a front-end assembly movable axially relative to the chassis;
    an idler coupled to the front-end assembly at a rotational axis of the idler;
    a rail coupled to one of the chassis and the front-end assembly; and
    a slider having:
       a first end coupled to the other of the chassis and the front-end assembly, and
       a second end opposite the first end;
    wherein the rail includes a v-shaped groove defined by a pair of surfaces that diverge as the surfaces extend laterally toward an opening of the v-shaped groove;
    wherein the slider includes a pair of sides that converge as the sides extend from the first end to the second end of the slider; and
    wherein when the slider is positioned in the v-shaped groove of the rail, the slider is movable relative to the rail in the vertical direction.

11. The undercarriage assembly of claim 10, where when the slider is positioned in the v-shaped groove of the rail, the rail and the slider are positioned between the forward end and the aft end of the chassis.

12. The undercarriage assembly of claim 11, wherein the rail includes an abutment surface positioned above the v-shaped groove when the rail is coupled to the chassis.

13. The undercarriage assembly of claim 12, wherein the chassis includes a strut positioned above the abutment surface of the rail to prevent upward movement of the rail beyond the strut.

14. The undercarriage assembly of claim 10, wherein the slider is removably coupled to one of the chassis and the front-end assembly.

15. The undercarriage assembly of claim 10, wherein the rail is removably coupled to one of the chassis and the front-end assembly.

16. The undercarriage assembly of claim 10, wherein the v-shaped groove is further defined by an inner surface positioned between the pair of surfaces; and
    the second end of the slider is spaced apart from the inner surface when the slider is positioned in the v-shaped groove of the rail.

17. The undercarriage assembly of claim 10, wherein:
    when the slider is positioned in the v-shaped groove of the rail, the slider is movable relative to the rail in the lateral direction.

18. The undercarriage assembly of claim 10, wherein the slider is movable in the vertical direction relative to the rail to open and close portions of a continuously downwardly-advancing passageway defined between the pair of sides of the slider and the pair of surfaces of the rail.

19. An undercarriage assembly for a work machine, comprising:
- a chassis extending from a forward end to an aft end;
- a ground-engaging mechanism configured to support the chassis;
- a front-end assembly movable axially relative to the chassis;
- an idler coupled to the front-end assembly at a rotational axis of the idler;
- a rail coupled to one of the chassis and the front-end assembly; and
- a slider having:
  - a first end coupled to the other of the chassis and the front-end assembly, and
  - a second end opposite the first end;
- wherein the rail includes a v-shaped groove defined by a pair of surfaces that diverge as the surfaces extend laterally toward an opening of the v-shaped groove;
- wherein the slider includes a pair of sides that converge as the sides extend from the first end to the second end of the slider; and
- wherein when the slider is positioned in the v-shaped groove of the rail, the slider is movable relative to the rail in the lateral direction.

20. The undercarriage assembly of claim 10, wherein the sides of the slider are symmetrical.

* * * * *